June 16, 1959     R. W. SMITH     2,890,804
BOTTOM UNLOADING HARVEST STORAGE UNIT Filed March 18, 1958     2 Sheets-Sheet 1

INVENTOR.
ROY W. SMITH
BY
CORBETT, MAHONEY, MILLER & RAMBO
ATT'YS.

June 16, 1959 R. W. SMITH 2,890,804
BOTTOM UNLOADING HARVEST STORAGE UNIT
Filed March 18, 1958 2 Sheets-Sheet 2
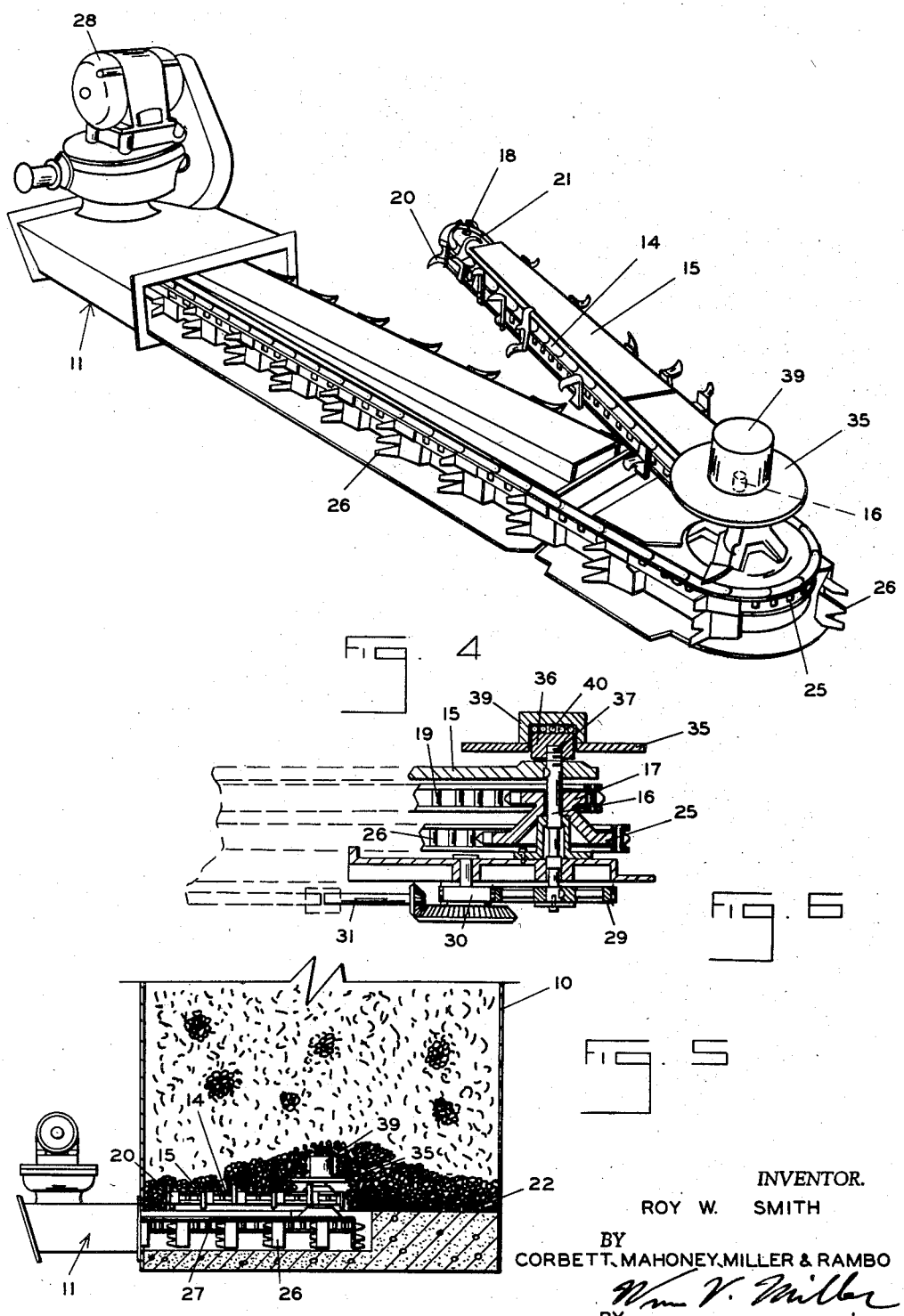
INVENTOR.
ROY W. SMITH
BY
CORBETT, MAHONEY, MILLER & RAMBO
BY ATT'YS.

United States Patent Office 2,890,804
Patented June 16, 1959

2,890,804

BOTTOM UNLOADING HARVEST STORAGE UNIT

Roy W. Smith, Galesburg, Ill.

Application March 18, 1958, Serial No. 722,229

5 Claims. (Cl. 214—17)

My invention relates to a bottom unloading harvest storage unit. It has to do, more particularly, with the mechanical bottom unloader used in a harvest storage unit which is usually in the form of a cylindrical tank.

Units of this type are commonly employed for the storage of various farm products such as corn, hay, silage, small grains, etc. The stored crop is removed at the lower end of the cylinder or tank by means of a mechanical unloader. This unloader includes a cutter arm which is pivoted at the center of the tank by means of a rotatable pivot post. The center post is driven so that the cutter arm advances in a slow swinging movement about the axis of this post and includes an endless chain with cutter hooks that runs along this arm and passes around a driving sprocket mounted rotatably on the center post. This sprocket is a double sprocket having a cutter chain driving sprocket on its upper end and a conveyor chain sprocket on its lower end. As the arm advances about the axis of the center post, the cutter chain is driven by its driving sprocket and cuts through the material, drawing it into the center of the tank where it is fed downwardly into a conveyor channel which leads radially through the bottom of the tank to a delivery point outside. An endless driven conveyor chain in the trough passes around the conveyor sprocket on the lower end of the double sprocket and drags the material outwardly from the center of the tank to the outside delivery point. The conveyor chain is driven by a motor outside the unit and drives the double sprocket which, in turn, drives the cutter chain. The center post is rotated by a sprocket keyed on the lower end thereof which is driven by ratchet means in association with the drive motor to slowly advance the arm independently of the conveyor and cutter chain drive. With semi-free or free-flowing materials, such as shelled corn, I have found that considerable power is required for turning the center post to advance the cutter arm. In fact, I have found that many times this produces an overload on the driving motor through the drive, which includes the sprocket keyed to the lower end of the post, causing it to burn out. In actual practice, I have determined that this difficulty is due mainly to the weight of the column of material in the tank exerted directly on the driven center post and resulting friction thereon and to the related drag on the post-driving sprocket carried at the lower end thereof and also to the material acting directly on the double sprocket.

It is the main object of this invention to provide effective means for relieving the unloader center post and associated parts of the direct weight and friction of the column of material in a harvest storing unit of the type indicated and thereby considerably reduce the amount of power required to drive the unloader.

It is another object to provide a very simple and inexpensive yet very effective arrangement for this purpose which can be readily mounted on existing units of this nature without any substantial changes.

Various other objects will be apparent.

In the accompanying drawings, I have illustrated the preferred form of my invention and in these drawings:

Figure 4 is a perspective view of the mechanical unloader.

Figure 5 is a vertical sectional view through a harvest storing unit with my invention applied to the bottom unloader and illustrating the action thereof.

Figure 6 is a detail in vertical section of the center post and associated driving mechanism.

Figure 1:
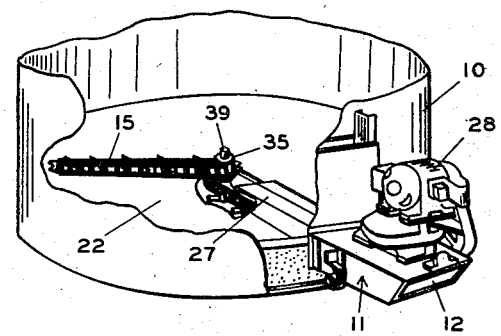
Figure 1 is a perspective view, partly broken away, showing a mechanical bottom unloader associated with a harvest storing unit, my invention being illustrated on the unloader.
Figure 2:
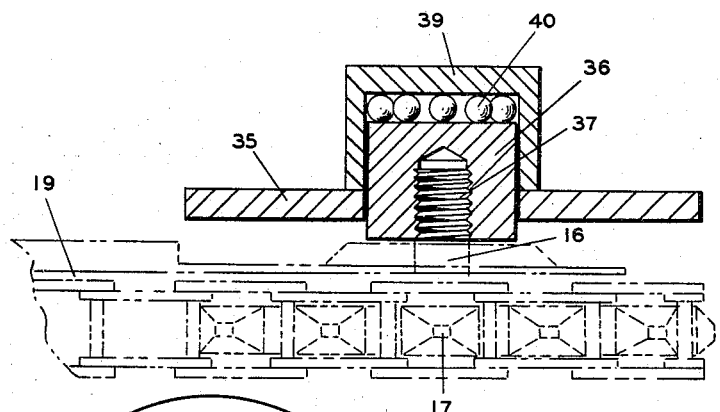
Figure 2 is an enlarged vertical sectional view at the center post of the unloader showing my invention associated therewith.
Figure 3:
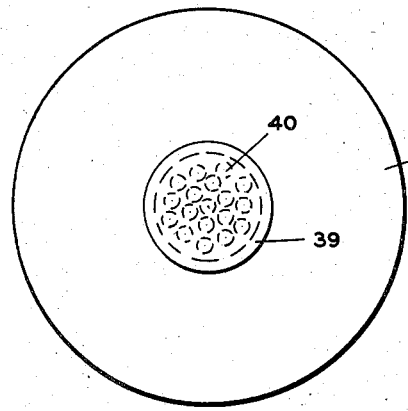
Figure 3 is a plan view of the structure of Figure 2.

With reference to the drawings, in Figures 1 and 5 I have illustrated my invention applied to a harvest storing unit of the type which comprises a substantially cylindrical vertical storage tank 10 constructed in any suitable manner. These tanks are unloaded from the bottom by means of a mechanical unloading unit indicated generally at 11. The unit 11 will remove material from the bottom of the tank and carry it to a discharge point 12 outside the tank.

The mechanical unloader unit 11 is illustrated best in Figure 4 and comprises a revolving cutter arm 15. This cutter arm is a rigid arm which is keyed on a driven center post 16. A cutter chain driving sprocket 17 is mounted concentric with and rotatably on this center post and the arm 15 carries another rotatable sprocket 18 at its outer end. A cutter chain 19 of the endless type passes along the arm and around the sprockets 17 and 18. At suitably spaced intervals, the cutter chain is provided with cutter hooks 20 which extend outwardly therefrom. The arm 15 will advance with a swinging movement about the axis of the center post 16 and its outer end will be supported by a roller 21 which will roll on the floor 22 of the tank 10 when it is properly positioned therein, as shown in Figure 1, with the center post 16 at the center of the tank.

The sprocket 17 is part of a double sprocket which has on its lower end another sprocket 25. This sprocket 25 receives an endless conveyor chain 26 of a conveyor unit which extends radially outwardly through a trough formed in the floor 22 of the tank 10. Plates 27, as shown in Figure 1, normally cover this trough. The conveyor chain 26 extends outwardly to the discharge point 12 and is suitably driven by means of the driving motor 28 disposed outside the tank. Thus, the chain 26 will drive the double sprocket which will, in turn, drive the cutter chain 19. The center post 16 is driven by means of a sprocket 29 keyed on the lower end of the post. This sprocket is driven by a sprocket 30 which is formed as a part of a spur and ring gear assembly that is driven by means of a shaft 31. The shaft 31 extends to a point outside the tank and is driven step-by-step by a ratchet wheel assembly (not shown) which is operated by the driving motor 28. Thus, the center post 16 is rotated step-by-step to slowly advance the cutter arm 15 about the axis of the post through the material in the tank.

According to my invention, the weight of the column of material in the tank 10 is prevented from acting directly on the center post 16 so as to prevent excessive drag on the post-driving sprocket 29. This is accomplished by providing the disc-like material-supporting member 35. This member 35 includes the disc body which is of substantial area and is mounted by means of a cylindrical bearing member 36 which is screwed on the threaded upper end 37 of the post 16, instead of the usual nut which is ordinarily threaded on the upper end of the post 16. The substitution of the member 36 for the usual nut is the only change required in applying my weight-relieving structure to the unloader. The center part of the disc member 35 is provided with an inverted bearing cup 39 which will slip over the bearing member 36 so that the members 35 and 36 will be free to rotate relatively, it being understood that the member 36 will rotate with the driven post 16. Between the top wall of the cup 39 and the top surface of the bearing member 36 I provide a suitable thrust bearing which is shown as being in the form of balls 40.

In the operation of this invention, as indicated in Figure 5 the material in the tank 10, for example shelled corn, will bear on the exposed arm 15 and as this arm slowly advances about the axis of the post 16, material will be fed radially inwardly towards the center post 16 at which point it will feed down around the double sprocket to the conveyor 26 which will take it radially outwardly to the discharge point 12. The center post 16 will be completely covered by the member 35 so that the weight of the column of material in the tank will not bear directly thereon and exert excessive friction to interfere with rotation of the post and advancing movement of the arm. The member 30 will remain stationary and the post 16 will rotate relative thereto, thereby relieving the post of friction and greatly reducing the drag on the sprocket 29 which drives the post. This will considerably reduce the amount of power required for advancing the arm 15. It will also materially reduce the grinding action caused by the double sprocket and the associated parts of the cutter and conveyor chains revolving in tightly packed material and the power necessary to drive that sprocket since the member 35 extends radially a sufficient distance to cover the double sprocket and associated chains.

It will be apparent from the above description that I have provided a simple arrangement for preventing the column of material in the tank 10 from bearing directly on the post 16 and on the double sprocket which includes sections 17 and 25. This will greatly reduce the power required to operate the mechanical bottom unloader for a storage unit of the type indicated.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In combination with a mechanical bottom unloader for a storage tank or the like having an arm mounted for advancing movement and a cutter chain extending along the arm, a center post on which said arm is mounted for movement about the axis thereof, a sprocket concentric with the center post and around which said cutter chain passes, means for advancing said arm, and a shield rotatably mounted on said center post, said center post being disposed substantially vertically and said shield including an enlarged substantially horizontally disposed plate-like portion having its periphery extending radially beyond the confines of said sprocket and the chain passing therearound so as to present a shielding cover therefor which is spaced above the sprocket.

2. The combination of claim 1 in which the sprocket is a double sprocket, and a conveyor chain also passes around said sprocket for conveying the material radially outwardly from the center post to a discharge point, said shield also extending outwardly beyond said conveyor chain passing around said sprocket.

3. In combination with a mechanical bottom unloader for a storage tank or the like having an arm for advancing movement and a cutter chain extending along the arm, a center post on which said arm is mounted for movement about the axis thereof, a sprocket concentric with the center post and around which said cutter chain passes, means for advancing said arm, and a shield mounted for rotation about the axis of said center post and extending radially from said post beyond the periphery of said sprocket and the chain passing therearound, said shield being mounted on the post by means of a bearing which permits relative rotation, said bearing including a central inverted bearing cup on the shield, and a bearing member mounted on said post for rotation therewith and fitting into said bearing cup.

4. The combination of claim 3 in which the bearing member is a cylindrical member which is threaded on the uper end of said post, said cup rotatably receiving said member.

5. The combination of claim 4 including an anti-friction thrust bearing between the upper end of said cylindrical member and the adjacent inner surface of the upper wall of the cup.

References Cited in the file of this patent

UNITED STATES PATENTS

| | | |
|---|---|---|
| 2,101,238 | Cartlidge | Dec. 3, 1937 |
| 2,336,181 | Lower | Dec. 7, 1943 |
| 2,635,770 | Tiedemann | Apr. 21, 1953 |